United States Patent [15] 3,647,984

Watanabe [45] Mar. 7, 1972

[54] MAGNETIC RECORDING AND/OR REPRODUCING DEVICE WITH TAPE ENGAGEMENT MEANS WHICH MOVES IN A CONCENTRIC PATH WITH THE HEAD

[72] Inventor: Yoshimi Watanabe, Tokyo, Japan

[73] Assignee: Sony Corporation, Tokyo, Japan

[22] Filed: July 1, 1969

[21] Appl. No.: 838,072

[30] Foreign Application Priority Data

July 4, 1968 Japan....................................43/46916

[52] U.S. Cl.....................179/100.2 Z, 179/100.2 T, 274/4 C

[51] Int. Cl.....................................G11b 15/66, G11b 23/04

[58] Field of Search............179/100.2 T, 100.2 MI, 100.2 Z; 226/49, 90, 91, 190; 242/55, 19 A; 274/4 D, 4 E, 4 C

[56] References Cited

UNITED STATES PATENTS 3,345,457 10/1967 MacLeod............................179/100.2

3,510,604 5/1970 Kell....................................179/100.2

3,107,279 10/1963 Hanes et al.......................179/100.2 Z

FOREIGN PATENTS OR APPLICATIONS 1,537,240 10/1967 Germany.........................178/100.2 T

OTHER PUBLICATIONS

IBM Technical Disclosure Bulletin, R. B. Johnson et al., Vol. 9 No. 8, Jan. 1967, page 968.

*Primary Examiner*—Bernard Konick
*Assistant Examiner*—Alfred H. Eddleman
*Attorney*—Lewis H. Eslinger and Alvin Sinderbrand

[57] ABSTRACT

A magnetic recording and/or reproducing apparatus having a guide drum and at least one rotary magnetic head associated therewith is provided with a device for automatically drawing a magnetic tape from a cassette and wrapping the tape about the guide drum for scanning by the rotary head. Such device includes at least one tape engaging means for engaging the tape in the cassette or cartridge when the apparatus is in an inactive condition and being moved in an arcuate and substantially concentric path about at least a portion of the periphery of the guide drum for wrapping the tape on the latter.

10 Claims, 5 Drawing Figures

Patented March 7, 1972 3,647,984

5 Sheets-Sheet 1

INVENTOR.

Yoshimi Watanabe

BY ATTORNEYS

INVENTOR.

Yoshimi Watanabe

BY

ATTORNEYS

Patented March 7, 1972 3,647,984

5 Sheets-Sheet 3

INVENTOR.

Yoshimi Watanabe

BY

ATTORNEYS

INVENTOR
Yoshimi Watanabe
BY
ATTORNEYS

Patented March 7, 1972 3,647,984

5 Sheets-Sheet 5

INVENTOR.

Yoshimi Watanabe

BY

ATTORNEYS

MAGNETIC RECORDING AND/OR REPRODUCING DEVICE WITH TAPE ENGAGEMENT MEANS WHICH MOVES IN A CONCENTRIC PATH WITH THE HEAD

BACKGROUND OF THE INVENTION

1. Field of the Invention

This invention relates generally to magnetic recording and/or reproducing apparatus, such as, video tape recorders, and more particularly to a device by which the magnetic tape is readily wrapped about a tape guide drum to make contact with a magnetic head associated therewith.

2. Description of the Prior Art

There has heretofore been proposed a magnetic recording and/or reproducing apparatus of the type in which a magnetic tape is directed around a tape guide drum over a predetermined angular range of, for example, 360° or 180° and is scanned by one or more rotary magnetic heads associated with the tape guide drum to magnetically record video signals on the tape and to reproduce the recorded signals therefrom. However, such a conventional magnetic recording and/or reproducing apparatus requires manual wrapping of the tape around the tape guide drum over the predetermined angular range and this wrapping operation is very troublesome. Further, this tape wrapping operation is further complicated when the tape is contained in a tape cartridge or cassette rather than in the usual open-type reels.

SUMMARY OF THE INVENTION

Accordingly, it is an object of this invention to provide a magnetic recording and/or reproducing apparatus with a tape loading or threading device by which the magnetic tape is easily wrapped around the tape guide drum.

It is another object of this invention to provide a device as aforesaid which is simple in construction but permits automatic lapping or wrapping of the magnetic tape around the tape guide drum.

It is another object of this invention to provide a magnetic recording and/or reproducing apparatus with a device by which the magnetic tape is snugly wrapped around the tape guide drum accurately over a predetermined angular range.

It is another object of this invention to provide a device as aforesaid by which the magnetic tape is helically directed around the tape guide drum.

It is another object of this invention to provide a recording and/or reproducing device as aforesaid by which the magnetic tape housed in a tape cartridge or cassette is automatically wrapped about the tape guide drum when the tape or cassette has been loaded at a predetermined position on the recording and/or reproducing apparatus.

It is still another object of this invention to provide a magnetic recording and/or reproducing apparatus with a tape loading or threading device which permits a sound recording and reproducing head and a erasing head to be disposed in the tape path remote from the tape guide drum.

The above, and other objects, features and advantages of this invention will become apparent from the following detailed description of illustrative embodiments which is to be read in conjunction with the accompanying drawings.

DESCRIPTION OF THE ILLUSTRATED EMBODIMENTS

Figure 1:
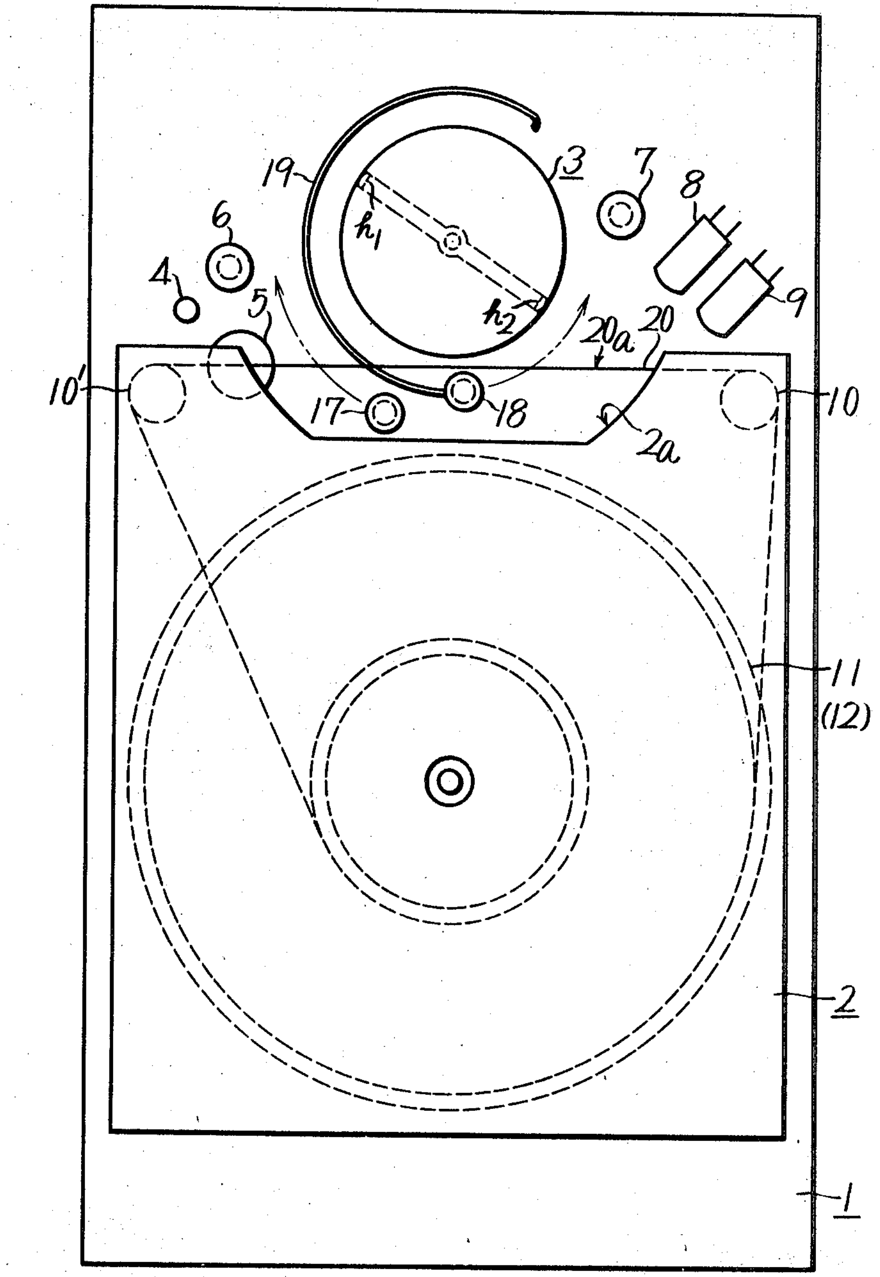
FIG. 1 is a plan view schematically illustrating one example of a tape loading or threading device for a magnetic recording and/or reproducing apparatus which is shown in its inactive condition.
Figure 2:
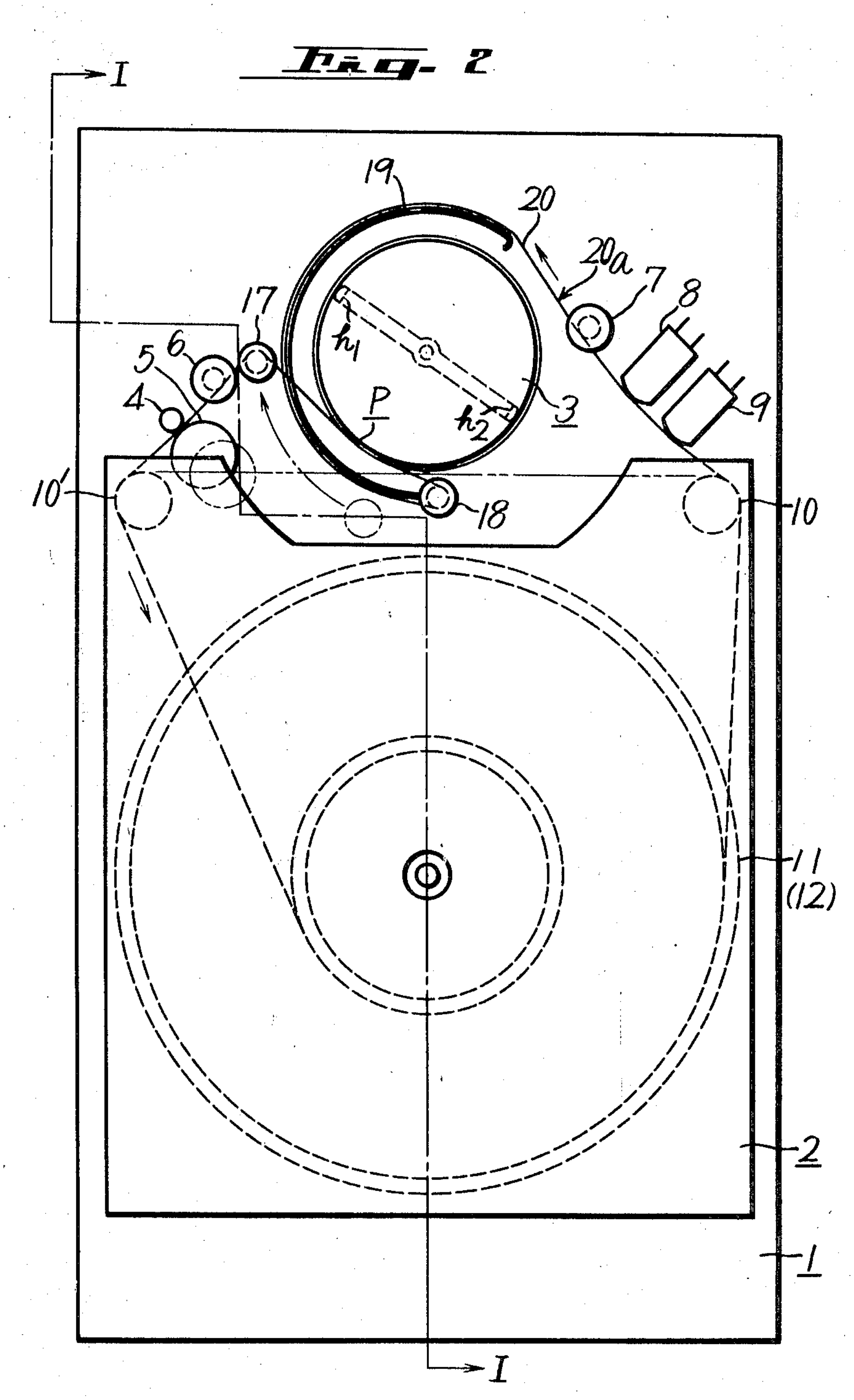
FIG. 2 is a plan view showing the magnetic recording and/or reproducing apparatus in its operative condition.
Figure 3:
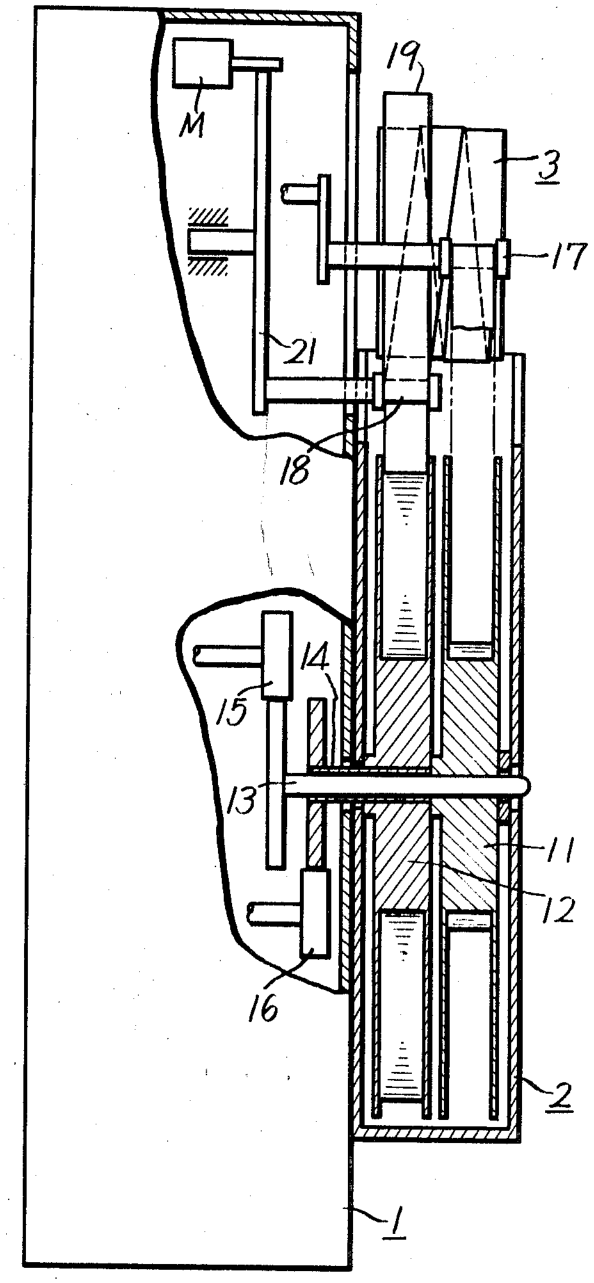
FIG. 3 is a cross-sectional view taken along the line I—I in FIG. 2.

In FIGS. 1 to 3, reference numeral 1 generally indicates a magnetic tape recording and reproducing apparatus to be used with a cartridge 2 containing a supply reel 11 and a takeup reel 12 concentrically disposed one above the other, and having a tape guide drum 3 with rotary magnetic heads $h_1$ and $h_2$. The magnetic tape recording and reproducing apparatus 1 further has mounted thereon a capstan 4, a pinch roller 5, a fixed pin 6 serving as a guide post at the tape offrunning side, another fixed pin 7 serving as a guide post at the tape oncoming side, a fixed sound recording and reproducing head 8 and an erasing head 9. The cartridge 2 has housed therein a pair of guide pins 10 located at opposite sides of an opening 2*a* and 10'. A magnetic tape 20 is drawn across the guide pins 10 and 10' from the supply reel 11 to the takeup reel 12 and the run 20*a* of the tape 20 extending between pins 10 and 10' is exposed at opening 2*a*. The supply reel 11 and the takeup reel 12 are mounted on the upper ends of telescoped rotary shafts 13 and 14, respectively (FIG. 3). Since the reels 11 and 12 are at different levels the magnetic tape 20 passing through the opening 2*a* runs obliquely with respect to the axis of tape guide drum 3. The shafts 13 and 14 are selectively driven by a motor (not shown) through idlers or gears 15 and 16 respectively.

In accordance with the present invention, the cartridge 2 is positioned so that the tape guide drum 3 is disposed in back of a magnetic surface on the exposed run 20*a* of the tape 20, that is, opposite the opening 2*a* of the cartridge 2. A tape guide member 18 fixed at one end to an auxiliary tape guide member 19 is initially located in the opening 2*a* so as to be disposed in front of run 20*a* of the tape 20. The auxiliary tape guide member 19 depicted in FIGS. 1 and 2 is an arcuate plate which, in the illustrated embodiment, is shown to be concentric with the tape guide drum 3. When the magnetic recording and reproducing apparatus is in its inoperative condition, the tape guide member 18 and the auxiliary tape guide member 19 assume the positions shown in FIG. 1. When the magnetic recording and reproducing apparatus is to be made operative for recording or reproducing, the tape guide member 18 and the auxiliary tape guide member 19 are turned counterclockwise about the tape guide drum 3 over an angular range of approximately 360° from the position of FIG. 1 to that of FIG. 2. To perform this, the tape guide member 18 and the auxiliary tape guide member 19 are formed integrally and the tape guide member 18 is attached to a disc 21, as shown in FIG. 3. The disc 21 is peripherally driven by the shaft of a motor M to turn the tape guide member 18 and the auxiliary tape guide member 19 in the manner described above. It is possible, of course, to turn the disc manually or by some other means.

Reference numeral 17 designates a guide pin mounted on the device 1. When the apparatus 1 is in its inoperative condition, such as shown in FIG. 1, the guide pin 17 lies within the opening 2*a* of the cartridge 2 in front of the tape run 20*a*. When the apparatus is placed in its operative condition, the guide pin 17 moves clockwise about the tape guide drum 3 to the position shown in FIG. 2. A guide groove may be provided for guiding the guide pin 17 in its movement about the tape guide drum 3 over an angular range of about 30°, and such movement may be effected by mounting pin 17 on an arm 17*a* which extends from a suitable turned shaft 17*b* (FIG. 3).

With such an arrangement as has been described in the foregoing, when the cartridge 2 is mounted on the apparatus 1 as depicted in FIG. 1 and the apparatus 1 is set in its operative condition for recording and reproducing, the tape guide member 18 is turned in the counterclockwise direction as viewed on FIG. 1 to draw the tape 20 in a counterclockwise direction out of the opening 2*a* of cartridge 2. Finally, the tape guide member 18 is brought to the position depicted in FIG. 2, thus lapping or wrapping the magnetic tape 20 around the tape guide drum 3. In this case the magnetic surface of the magnetic tape 20 thus wrapped about the tape guide drum 3 makes contact with the outer peripheral surface of the guide drum 3 to be scanned by the rotary magnetic heads $h_1$ and $h_2$ for recording or reproducing. Further, the magnetic tape 20 is guided by the outer peripheral surface of the auxiliary tape guide member 19 at the oncoming side of the tape guide drum 3, the tape 20 at the oncoming side does not ever contact the tape guide drum 3. With the provision of the auxiliary guide member 19, the magnetic tape 20 is urged into contact with the sound recording head 8 and the erasing head 9 between the guide member 19 and the guide pin 10.

Further, with the guide pin 17 moved to the position shown in FIG. 2, the magnetic tape 20 coming off the drum 3 is led to a path extending between the pins 6 and 10 and is driven in the direction of arrows A by reason of its being gripped between the capstan 4 and the pinch roller 5 pressed against it. Consequently, the tape 20 is directed or wrapped around the tape guide drum 3 over a certain angular range which, in the illustrated embodiment is 360°, so that the wrapped tape is in the form of the greek letter $\alpha$.

With the tape wrapped 360° about drum 3, the tension in the tape 20 on the guide pin 17 at the offrunning side of the tape guide drum 3 greatly exceeds the tension in the tape 20 on the tape guide member 18 at the oncoming side of the tape guide drum 3. Therefore, it is preferred to move the guide pin 17 and the tape guide member 18 so that the tape 20 is directed around a 90° portion of the guide pin 17 and around a 180° portion of the tape guide member 18 so that the frictional resistance to movement of the tape 20 exerted by the guide pin 17 is appreciably smaller than that exerted by the tape guide member 18.

Under the condition shown in FIG. 1, the tape 20 is obliquely stretched between the guide pins 10 and 10', so that the tape 20 is helically wrapped about the tape guide drum 3 by the rotational movements of the guide pin 17 and the tape guide member 18 to the positions depicted in FIG. 2. Further, the heights of the guide pin 17 and the tape guide member 18 are selected so that the tape 20 does not contact itself at its crossover point when the tape 20 has been finally lapped or wrapped around the drum 3. The guide pin 17 and the tape guide member 18 are constructed to be high enough to catch the tape 20 when the apparatus 1 is held in its inoperative condition. In addition, the pinch roller 5 is adapted to be in a lowered condition while the apparatus 1 is held in its inoperative condition and to be lifted up into contact with the capstan 4 after the guide pin 17 has been shifted to the position shown in FIG. 2.

Figure 4:
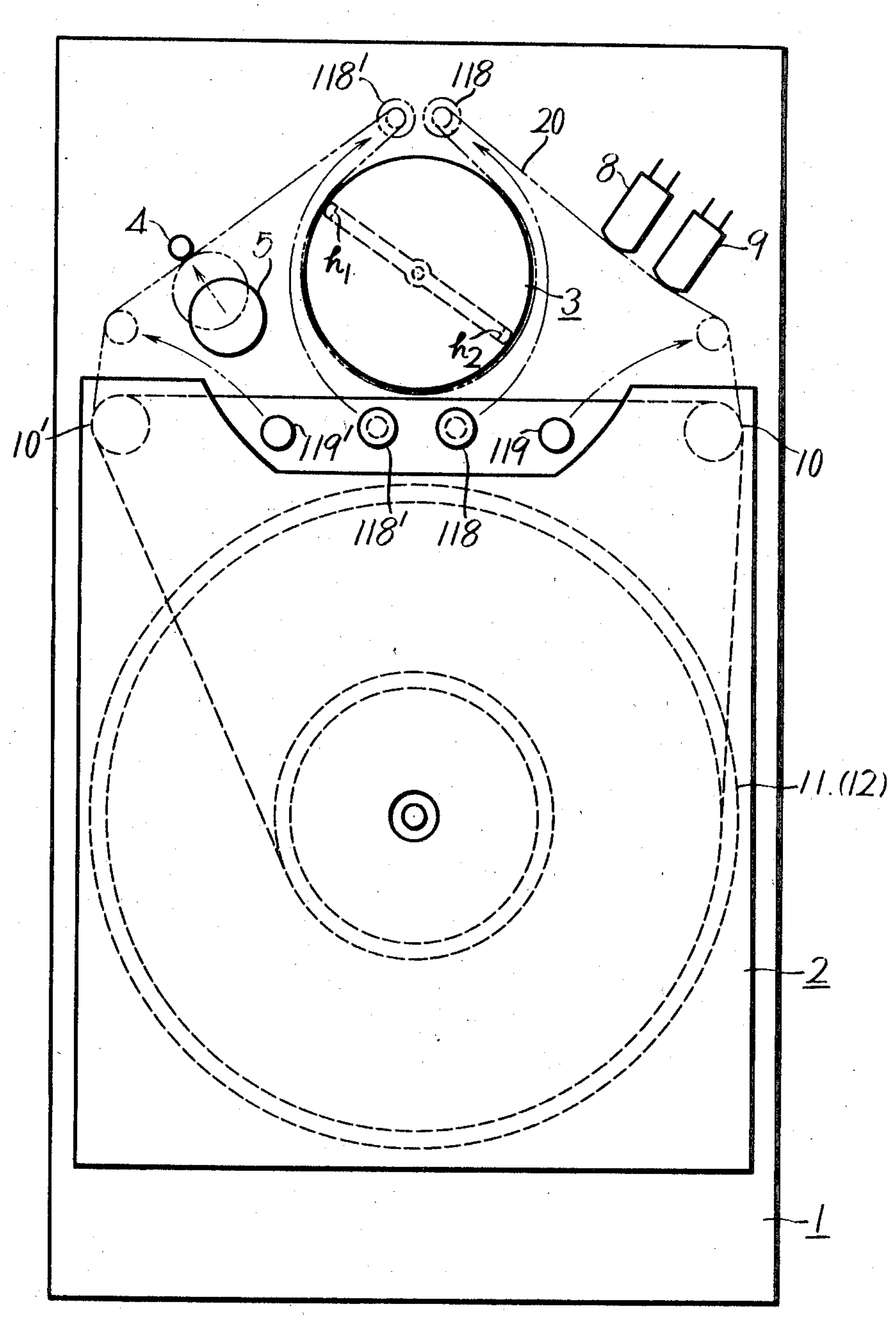
FIGS. 4 and 5 are plan views schematically illustrating other embodiments of this invention.

FIG. 4 illustrates another embodiment in which a pair of tape guide members 118 and 118' and a pair of auxiliary tape guide members 119 are employed and 119'. The tape guide members 118 and 118' are respectively turned through approximately 150° by drive means (not shown) in counterclockwise and clockwise directions, thereby directing the tape 20 around the tape guide drum 3 over an angular range of about 300°. Further, the auxiliary tape guide members 119 and 119' are adapted to be shifted to positions indicated by broken lines in FIG. 4 along straight or other suitable loci. Since the other elements appearing on FIG. 4 are similar to those in FIGS. 1 to 3, no description will be given thereof.

Figure 5:
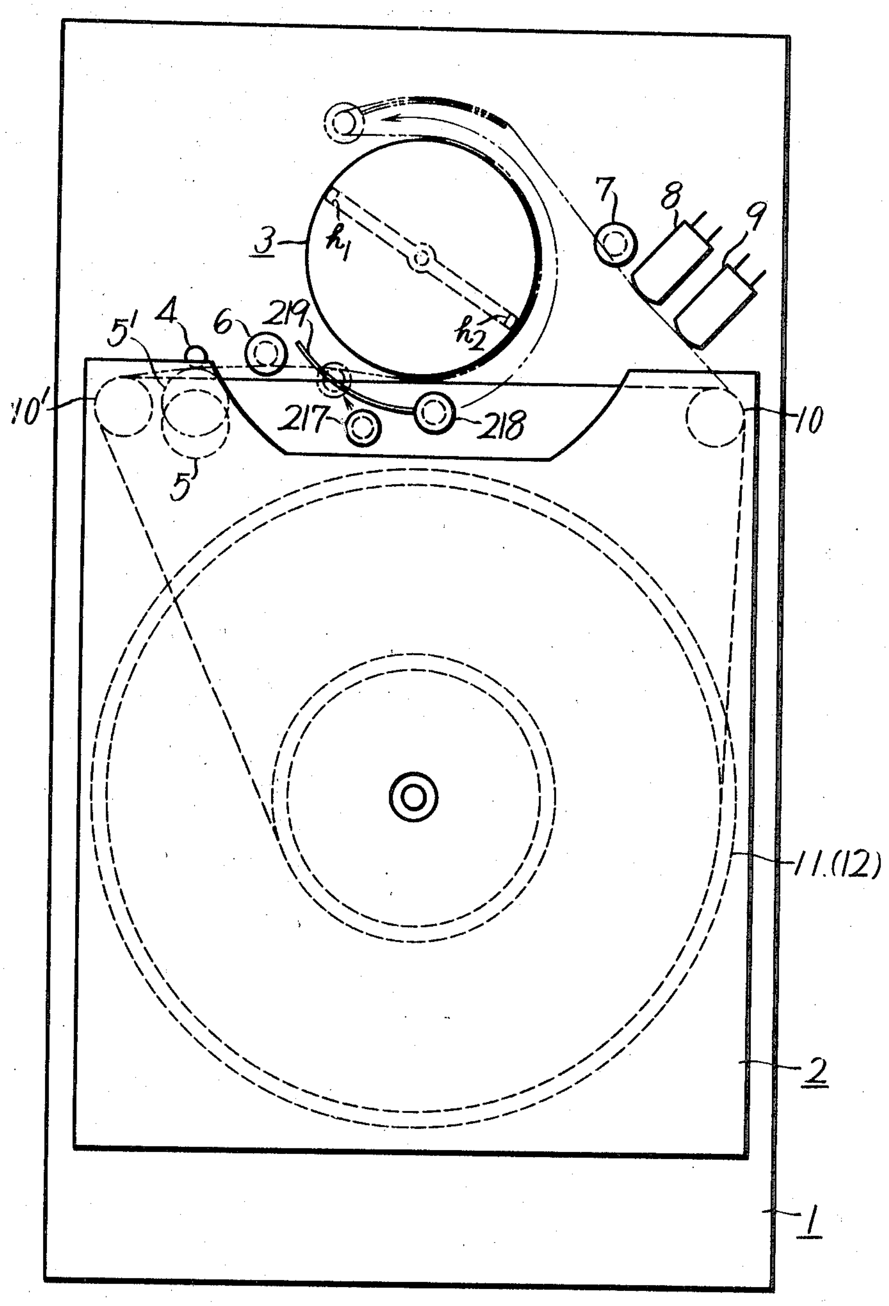

FIG. 5 shows still another embodiment of this invention, in which a tape guide member 218 and an auxiliary tape guide member 219 are integral with each other. Reference numeral 217 indicates a guide pin. The guide members 218 and 219 are turned about through 180° in a counterclockwise direction and the tape guide pin 217 is turned through 30° in a clockwise direction, whereby the magnetic tape 20 is wrapped about the tape guide drum 3 over an angular range of approximately 180°. Since the other elements are similar to those in FIGS. 1 to 3 there is no need for further description thereof.

The foregoing examples employ two rotary magnetic heads but may use one head or three or more heads. Although the present invention has been described in connection with a cassette type magnetic recording and reproducing apparatus, it will be seen that the invention is applicable to the open reel type, endless tape type and other type magnetic recording and reproducing devices.

It will be apparent that many modifications and variations may be effected without departing from the scope of the novel concepts of this invention.

I claim:

1. A recording and/or reproducing apparatus comprising magnetic tape on spaced takeup and supply reels, a cylindrical tape guide drum, at least one rotary head moving in a path substantially coinciding with the periphery of said drum, at least one engaging means adapted to engage said tape when said apparatus is in an inactive condition, means for moving said engaging means in an arcuate path about at least a portion of the periphery of said drum during which movement said tape is moved into engagement with said drum for scanning by said rotary head, additional tape engaging means for holding the tape away from said guide drum except at said predetermined portion thereof, and said means for moving said engaging means also moving said additional tape engaging means whereby said additional tape engaging means and said engaging means move in synchronism.

2. A magnetic recording and/or reproducing apparatus comprising magnetic tape on spaced takeup and supply reels, a cylindrical tape guide drum, at least one rotary head moving in a path substantially coinciding with the periphery of said drum, at least one engaging means adapted to engage said magnetic tape when said apparatus is in an inactive condition, means for moving said engaging means in an arcuate path about at least a portion of the periphery of said drum during which movement said magnetic tape is moved into engagement with a predetermined peripheral portion of said drum for scanning by said rotary head, and the arcuate path of said engaging means being substantially concentric with the path of travel of said head.

3. Apparatus in accordance with claim 2 wherein the diameter of the path of travel of said engaging means is greater than the diameter of the path of travel of said head.

4. Apparatus for recording and/or reproducing on magnetic tape, said apparatus comprising a cylindrical drum, support means for said drum, at least one rotary head moving in a head path substantially coinciding with the periphery of said drum and lying in a plane perpendicular to the axis of said drum, means for supporting supply and takeup reels for the magnetic tape with the tape path between the reels and said plane of the head path being inclined relative to each other, at least one engaging means adapted to engage said tape between the reels when said apparatus is in an inactive condition, means for changing said engaging means to an active condition by moving said engaging means in an arcuate path about at least a portion of the periphery of said drum to bring said tape into helical engagement with said drum for scanning of said tape by said rotary head, and additional tape engaging means for holding the tape away from said guide drum except at said predetermined peripheral portion thereof.

5. The apparatus of claim 4, further comprising a cassette housing said reels and having an opening at which a run of said tape between said reels is exposed, and in which said engaging means includes a pin which, in said inoperative condition of the apparatus, extends into said opening of the cassette and lies at the side of said tape run facing away from said guide drum.

6. The apparatus of claim 4 in which said supply and takeup reels are spaced different distances from the end of said drum closer to said support means, and at least said additional tape engaging means pass between said tape and said support means as said one engaging means and said additional means move from said inactive position to said active position.

7. The apparatus of claim 4, in which said takeup and supply reels are axially superposed.

8. The apparatus of claim 4, further comprising fixed magnetic heads disposed to be engaged by said tape between said guide drum and said reels when said tape is moved into engagement with the drum.

9. The apparatus of claim 4, wherein said additional tape engaging means are connected with said one engaging means for movement with the latter.

10. The apparatus of claim 9, in which said one engaging means is in the form of a guide pin and said additional tape engaging means is in the form of an arcuate plate extending from said guide pin.

* * * * *